(No Model.) 2 Sheets—Sheet 1.
E. L. FORSGREN.
TRUNK.
No. 519,179. Patented May 1, 1894.
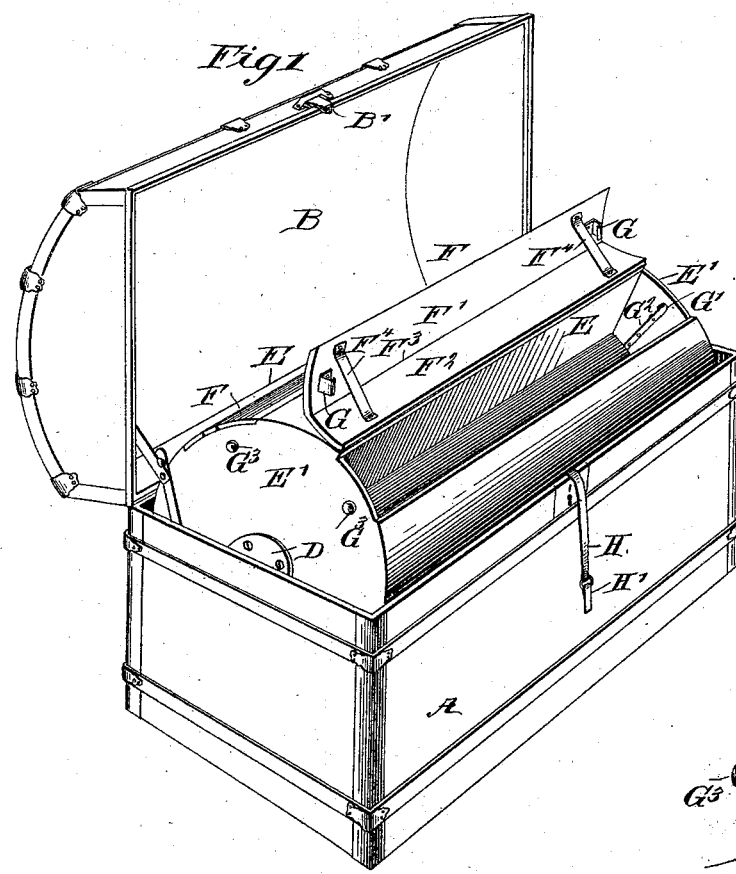
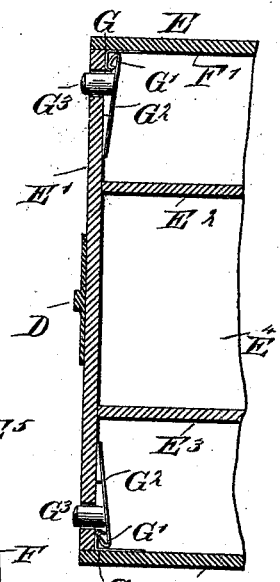
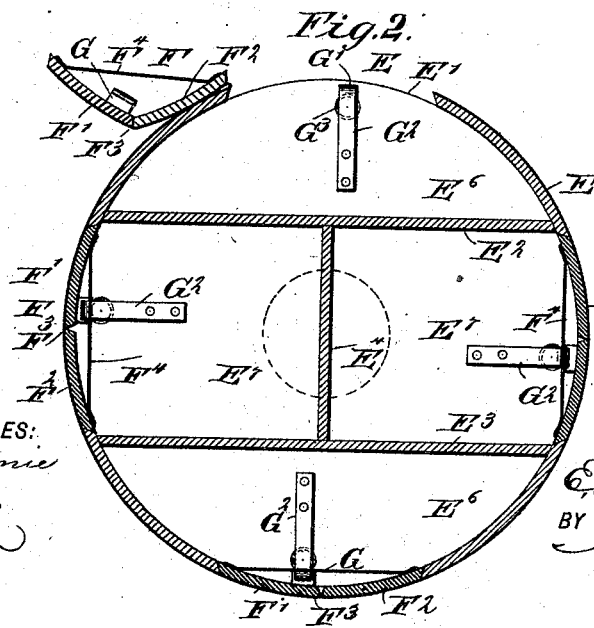
WITNESSES:
John A. Rennie
C. Sedgwick
INVENTOR
E. L. Forsgren
BY
Munn & Co
ATTORNEYS.

(No Model.) 2 Sheets—Sheet 2.
E. L. FORSGREN.
TRUNK.
No. 519,179. Patented May 1, 1894.
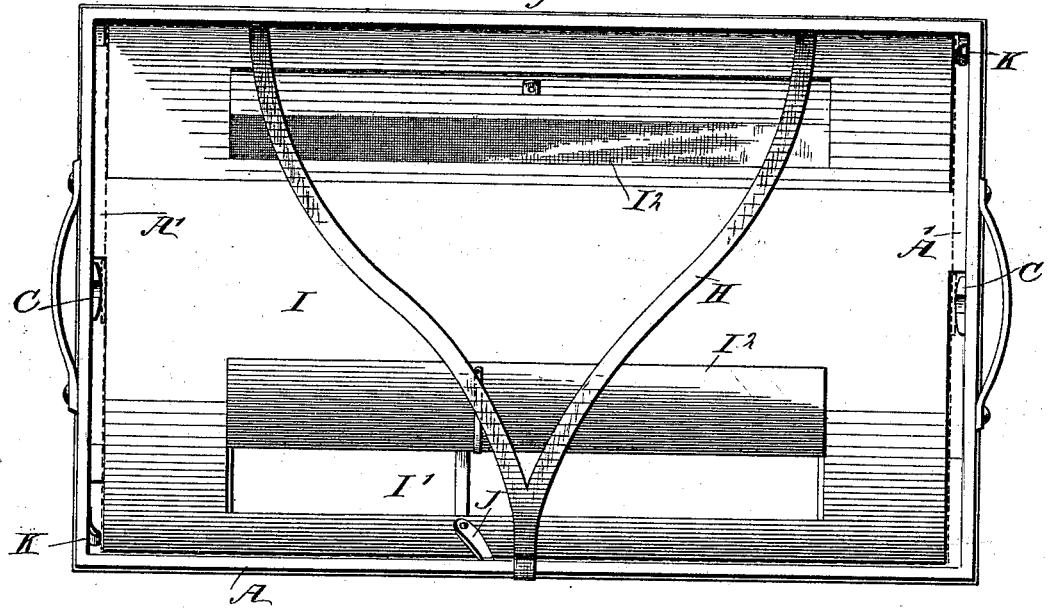
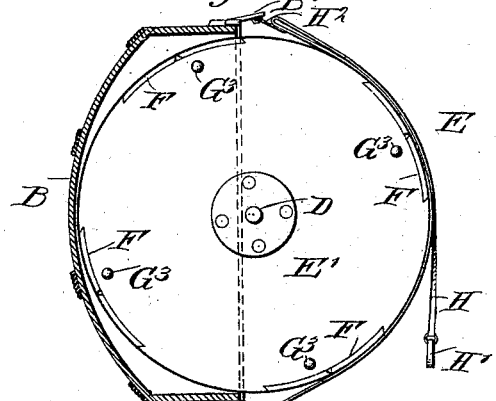
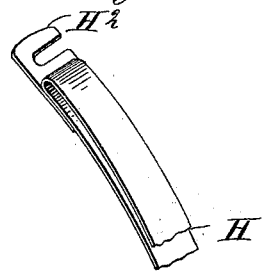
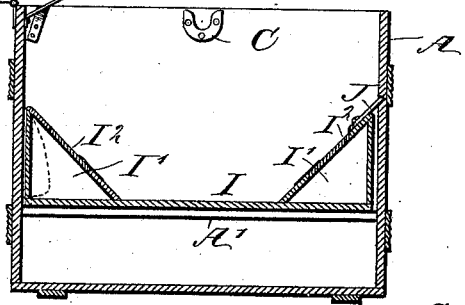
WITNESSES:
John A. Rennie
C. Sedgwick
INVENTOR
E. L. Forsgren
BY
Munn & Co
ATTORNEYS.

UNITED STATES PATENT OFFICE.

ERNST L. FORSGREN, OF NEW YORK, N. Y.

TRUNK.

SPECIFICATION forming part of Letters Patent No. 519,179, dated May 1, 1894.

Application filed October 6, 1893. Serial No. 487,318. (No model.)

*To all whom it may concern:*

Be it known that I, ERNST L. FORSGREN, a subject of the King of Sweden and Norway, at present residing in the city, county, and State of New York, have invented a new and Improved Trunk, of which the following is a full, clear, and exact description.

The invention relates to trunks having a removable casing within an outer shell, and its object is to provide a new and improved trunk which is simple and durable in construction, and arranged to permit of conveniently packing the trunk and removing articles therefrom in any compartment, without disturbing the contents of the other compartments.

The invention consists of a casing mounted to turn in the shell and provided with longitudinal partitions forming separate compartments, and a hinged cover for each compartment and made of two spring-pressed sections.

The invention also consists of certain parts and details, and combinations of the same, as will be hereinafter described, and then pointed out in the claims.

Reference is to be had to the accompanying drawings, forming a part of this specification, in which similar letters of reference indicate corresponding parts in all the figures.

Figure 1 is a perspective view of the improvement. Fig. 2 is an enlarged cross section of the casing. Fig. 3 is a longitudinal section of one end thereof. Fig. 4 is a plan view of the exterior shell with its cover and the interior casing removed. Fig. 5 is a transverse section of the improvement with the casing moved into the cover of the shell; and Fig. 6 is an enlarged perspective view of the catch for the band for raising the casing into the cover.

The improved trunk is provided with a suitably constructed exterior shell A, provided with a hinged cover B, of ordinary construction and adapted to close the shell A and be locked thereto in the usual manner. On the inner faces of the ends of the shell A are secured the open bearings C, adapted to be engaged by trunnions D, attached centrally to the heads $E'$ of a cylindrical casing E, fitting into the shell A and adapted to be drawn into the cover B, as hereinafter more fully described, and illustrated in Fig. 5. When the trunnions D are in engagement with the open bearings C (see Fig. 1), then the casing E can be rotated so as to bring any desired part of the casing to the top.

The casing E is provided with a series of longitudinal partitions $E^2$, $E^3$ and $E^4$ of which the partitions $E^2$ and $E^3$ are arranged parallel to each other and are connected by the partition $E^4$ extending through the center of the cylindrical casing E; see Fig. 2. The partitions arranged in this manner form with the rim $E^5$ of the casing two shallow compartments $E^6$ and two deeper compartments $E^7$, as will be readily understood by reference to the said Fig. 2. The rim $E^5$ is cut out over each compartment, and the opening thus formed is adapted to be closed by a cover F, made in two sections $F'$ and $F^2$ of which the section $F^2$ is hinged to the rim $E^5$ at one side of the opening, and the two sections are flexibly connected with each other at their adjacent edges at $F^3$. The section $F^2$ is also connected by one or more elastic bands $F^4$, with the free end of the outermost section $F'$, so that when the cover F is in an open position, as illustrated in Figs. 1 and 2, the two sections stand at angles to each other, instead of forming a segment as is the case when the cover is closed over the opening, and forms a continuation of the cylindrical rim of the casing.

In order to hold each cover F in a closed position over the entrance opening of the respective compartment, I provide locking devices at each end of the casing, each locking device comprising a keeper G, secured to the respective end of the outer section $F'$ of the cover F, the keeper being secured to the under side of the said section and being adapted to engage with the hook end $G'$ of a spring catch $G^2$, secured to the inner face of the respective head $E'$. A button $G^3$, extends from the spring catch $G^2$ through an aperture in the respective head $E'$, so that the operator can conveniently press the said button from the outside of the corresponding head $E'$. Now, it will be seen that when a compartment of the casing E is on the top and above the upper end of the shell A, and the operator desires to open this compartment, he presses the two buttons $G^3$ in the heads $E'$, so that the spring catches G² disengage the corresponding keepers G on the ends of the section F' of the cover F. As soon as the cover is released, the elastic bands F⁴ pull the two sections into the angular position above described, and illustrated in Figs. 1 and 2, so that the operator can conveniently swing the cover back to get access to the respective compartment. When it is desired to close the compartment, the operator first swings the cover F downward and then presses upon the same at the joint of the sections F' and F², so as to cause the said sections to swing until they fit completely over the opening, and the keeper G is at the same time engaged by the spring catch G², which thus locks the cover in place. The elastic bands F⁴ are stretched during this operation and remain so as long as the cover is closed over the opening for the respective compartment.

In order to conveniently remove the casing E from the outer shell A and to temporarily hold the same in the cover B, as illustrated in Fig. 5, I provide a band or strap H, secured at one end to the rear side of the shell A near the upper end thereof and at the inside, the said band encircling about one-half of the casing E, its free end hanging loosely over the front end of the shell, as plainly illustrated in Fig. 1.

On the free end of the band H is arranged a handle H', and on the band between the handle and its fastened end is secured a hook H², adapted to be hooked onto the staple of the locking catch B', held on the cover B; see Fig. 5. Now, when the casing E is in position in the shell A, as illustrated in Fig. 1, and the operator exerts a pull on the handle H' of the band H, then the said casing is lifted upward so that the trunnions D are disengaged from the bearings C, and the casing is finally lifted into the cover B, after which the operator hooks the hook H² onto the staple of the catch B' as shown in Fig. 5, so that the casing is locked to the cover B. The operator has now access to the interior of the shell A, which latter is provided with a removable tray I, set on cleats A', so as to form below the tray an additional compartment extending throughout the length of the shell. The tray I is provided at its sides with longitudinally-extending compartments I' having lids I². A catch J is secured on the tray I and is adapted to engage a notch on the inner face of the front of the shell A to lock the said tray in place so as not to touch the casing E.

In order to prevent the casing E from revolving too freely in the shell A, when transporting the trunk from one place to another, I provide the ends of the shell A with springs K, engaging with their free ends the heads E' of the casing, thus forming a brake for the said casing.

Having thus fully described my invention, I claim as new and desire to secure by Letters Patent—

1. A trunk comprising a casing adapted to turn in an exterior shell and provided with longitudinal partitions forming separate compartments, and a hinged cover for each compartment and made in two spring-pressed sections, substantially as shown and described.

2. A trunk comprising a casing adapted to turn in an exterior shell and provided with longitudinal partitions forming separate compartments, a hinged cover for each compartment and made in two spring-pressed sections, and spring catches for the said cover to lock the same in place over the compartment, substantially as shown and described.

3. A trunk comprising an exterior shell having a cover, a casing mounted to turn in the said shell, and a band secured at one end to the said shell and adapted to engage the said casing to lift the latter out of the shell into the said cover, substantially as shown and described.

4. A trunk comprising an exterior shell having a cover, a casing mounted to turn in the said shell, a band secured at one end to the said shell and adapted to engage the said casing to lift the latter out of the shell into the said cover, and a hook held on the said band and adapted to engage part of the said cover to lock the band and casing in place on the cover, substantially as shown and described.

5. A trunk comprising an exterior shell having a hinged cover, a tray set on cleats in the said shell, a casing provided with trunnions adapted to engage bearings in the ends of the said shell to permit the casing to revolve in the latter, and a band secured on one side of the said shell and adapted to engage the said casing to lift the latter out of the shell to give access to the said tray, substantially as shown and described.

6. A trunk comprising an exterior shell provided with bearings at its ends, a cylindrical casing provided in its heads with trunnions adapted to engage the said bearings, the said casing being provided with compartments and hinged covers, and spring forming a brake for the said casing to prevent the latter from accidentally turning in the said shell, substantially as shown and described.

ERNST L. FORSGREN.

Witnesses:
MAX DICKMAN,
SAMUEL JOSEPHS.